(12) United States Patent
Fan et al.

(10) Patent No.: US 8,664,929 B2
(45) Date of Patent: Mar. 4, 2014

(54) AUDIO-SKIPPING OF A CONSTANT ON-TIME POWER CONVERTER

(75) Inventors: Po-Chin Fan, New Taipei (TW); Kuo-Ping Liu, Hsinchu County (TW)

(73) Assignee: Ricktek Technology Corp., Chupei, Hsinchu (TW)

( * ) Notice: Subject to any disclaimer, the term of this patent is extended or adjusted under 35 U.S.C. 154(b) by 183 days.

(21) Appl. No.: 13/307,644

(22) Filed: Nov. 30, 2011

(65) Prior Publication Data

US 2012/0133348 A1 May 31, 2012

(30) Foreign Application Priority Data

Nov. 30, 2010 (TW) .................................. 99141405 A

(51) Int. Cl.
*G05F 1/00* (2006.01)
(52) U.S. Cl.
USPC .......................................... 323/284; 323/285
(58) Field of Classification Search
USPC .................. 323/222–226, 271–277, 280–286
See application file for complete search history.

(56) References Cited

U.S. PATENT DOCUMENTS

| | | | |
|---|---|---|---|
| 6,212,079 B1 * | 4/2001 | Balakrishnan et al. | 363/21.03 |
| 7,541,795 B1 * | 6/2009 | Smith et al. | 323/285 |
| 7,652,461 B2 | 1/2010 | Tateishi | |
| 7,923,977 B2 * | 4/2011 | Huang | 323/271 |
| 2005/0275392 A1 * | 12/2005 | Wong et al. | 323/283 |
| 2006/0113980 A1 * | 6/2006 | Yoshida | 323/282 |
| 2006/0119340 A1 * | 6/2006 | Tateishi | 323/284 |
| 2007/0247121 A1 * | 10/2007 | Wu et al. | 323/222 |
| 2009/0206814 A1 * | 8/2009 | Zhang et al. | 323/284 |
| 2010/0134080 A1 * | 6/2010 | Ouyang | 323/282 |
| 2010/0148741 A1 * | 6/2010 | Chen et al. | 323/285 |
| 2010/0308784 A1 * | 12/2010 | Scoones et al. | 323/282 |
| 2011/0109290 A1 * | 5/2011 | Tang et al. | 323/282 |
| 2011/0121804 A1 * | 5/2011 | Kudo | 323/282 |

* cited by examiner

*Primary Examiner* — Timothy J Dole
*Assistant Examiner* — Yusef Ahmed
(74) *Attorney, Agent, or Firm* — Muncy, Geissler, Olds & Lowe, P.C.

(57) ABSTRACT

When the switching frequency of a constant on-time power converter decreases to a threshold, the power converter is switched from the original operation of triggering a constant on-time of a high-side switch responsive to the output voltage of the power converter reaching a valley point to the operation of triggering a constant off-time of the high-side switch responsive to the output voltage reaching a peak point, to thereby prevent the power converter from operating in an audio frequency range.

6 Claims, 7 Drawing Sheets

US 8,664,929 B2

AUDIO-SKIPPING OF A CONSTANT ON-TIME POWER CONVERTER

FIELD OF THE INVENTION

The present invention is related generally to a power converter and more particularly, to control method and circuit for audio-skipping of a constant on-time (COT) power converter.

BACKGROUND OF THE INVENTION

A conventional DC-DC switching converter has excellent conversion efficiency for heavy loading, yet has poor efficiency for light loading due to the switching loss under its constant switching frequency. A popular improvement is to employ a pulse-skipping mode (PSM) to remove the limitation of constant switching frequency to reduce the switching loss and thereby improve the conversion efficiency. However, this art introduce an accompanying problem. As the load reduces more and more, the switching frequency may decrease to an audible range, i.e. 20 Hz-20 kHz. Due to the piezoelectric effect of the capacitor's material, the instant switching current imparting on the capacitor will cause a large mechanical energy that brings about audio vibration and thereby undesirable noise. This phenomenon often happens to the input capacitor of a buck converter and the output capacitor of a boost converter.

The most forthright way to eliminate the audio noise is to limit the lowest boundary of the switching frequency, for example 25 kHz. However, doing this brings a burden to a constant on-time (COT) power converter. As shown in FIG. 1, a COT buck converter triggers the on-time Ton of the high-side switch when the output voltage Vout decreases to a preset valley point, and the on-time Ton is constant. At the end of the on-time Ton, the high-side switch is turned off, and until the output voltage Vout decreases to the valley point once more, the on-time Ton is triggered again. As loading decreases, the decreasing speed of the output voltage Vout becomes lower, so that the off-time Toff of the high-side switch becomes longer and thus the switching cycle Tsw becomes longer, i.e. lower switching frequency. Introduced with zero inductor current detection (ZCD), a COT power converter can generate PSM naturally, employing a constant on-time for the high-side switch and triggering the on-time for the next cycle at the valley point of the output voltage, for balance between the output current and the loading current, to regulate the output voltage at a preset level. However, at light loading state, due to the set lower limit to the switching frequency, the high-side switch will be turned on before the output voltage reaches the valley point, which necessarily causes the output current becoming greater than the loading current and thereby increasing the output voltage.

FIG. 2 is a waveform diagram of an inductor current of a conventional COT buck converter. For balance between the output current and the loading current in order to regulate the output voltage, each time the switching frequency decreases to the lower limit 25 kHz, or the switching cycle Tsw reaches the upper limit 40 μs, at time t1, the low-side switch is first turned on to allow the inductor current become negative, and until time t2, when the output voltage reaches the valley point, the constant on-time Ton is triggered. Then, at time t3 the high-side switch is turned off and the low-side switch is turned on, and until time t4, the inductor current decreases to zero, and the low-side switch is turned off, so a switching operation is finished. In this method, the net output of the positive and negative inductor currents is equal to the loading current, and the valley point of the output voltage can be maintained at the set value, while the negative inductor current results in degraded conversion efficiency, and the smaller the loading current is, the more significant the loss of the conversion efficiency is.

U.S. Pat. No. 7,652,461 provides a buck converter operating free of an audible frequency range, having the circuit as depicted in FIG. 3, which includes a pair of high-side switch M1 and low-side switch M2, a zero current detector 10, a comparator 12, an on-time circuit 14, a timer 16 and an on-time shaver 18. Once the zero current detector 10 detects the inductor current IL as zero, the low-side switch M2 is turned off to avoid negative inductor current, which otherwise will degrade the conversion efficiency of light loading. A reference voltage Vref determines the valley point of the output voltage Vout, and the comparator 12 compares a feedback voltage FB related to the output voltage Vout with the reference voltage Vref so that the signal S1 is pulled high when the feedback voltage FB decreases to cross over the reference voltage Vref, to trigger an SR flip-flop 20 to turn on the high-side switch M1. Then, after a time period, the on-time circuit 14 will reset the SR flip-flop 20 to turn off the on-time of the high-side switch M1. The timer 16 counts the off-time of the high-side switch M1, namely the sum of the on-time of the low-side switch M2 and the time when the switches M1 and M2 are both off. When loading is so light that the output voltage Vout decreases very slowly to thereby have the switching cycle Tsw reaching the preset upper limit, the timer 16 pulls high the signal S2 to forcibly trigger the SR flip-flop 20 to turn on the high-side switch M1, thereby preventing the switching frequency from decreasing to the audible range. For preventing the timer 16 from affecting stability of the output voltage Vout, an offset voltage Voff1 is set in the on-time shaver 18. When the feedback voltage FB is greater than the sum of the offset voltage Voff1 and the reference voltage Vref, a transconductance amplifier 22 outputs a current positively proportional to Voff1+Vref-FB, which is multiplied by the output voltage Vout and then sent to the on-time circuit 14 for changing the threshold of the on-time circuit 14, to shave the on-time of the high-side switch M1, thereby decreasing the inductor current IL for balance to the loading current. By eliminating negative inductor current, this art provides better efficiency for light loading. However, the output voltage Vout will be related to the open-loop gain of the transconductance amplifier 22.

SUMMARY OF THE INVENTION

An objective of the present invention is to provide a control method and circuit for preventing a constant on-time power converter from operating in an audible frequency range.

Another objective of the present invention is to provide a simple control method and circuit for audio-skipping of a constant on-time power converter.

Instead of changing the on-time determined by an on-time circuit, a control method and circuit according to the present invention switch the original operation of triggering the on-time of the high-side switch whenever the output voltage reaches the valley point to the operation of triggering the off-time of the high-side switch whenever the output voltage reaches the peak point once the switching cycle reaches the upper limit, which switches the power converter from a constant on-time system to a quasi-constant off-time system with the sum of the time when the low-side switch is on and the time when both the switches are off being set constant, and triggering the on-time of the high-side switch after lapse of the sum of times. After the system is switched to the operation of using peak-point triggering, the on-time of the high-side switch which is from the time when it is triggered to the time when the output voltage reaches the peak point is no longer fixed, thereby reducing the inductor current for balance to the loading current.

According to the present invention, when a switching frequency decreases to a threshold, a control method for audio-skipping of a constant on-time power converter having a pair of high-side switch and low-side switch switched at the switching frequency switches the power converter to a quasi-constant off-time mode where a constant off-time of the high-side switch is triggered responsive to an output voltage reaching a peak point. Preferably, when the switching frequency decreases to the threshold, a reference voltage originally used to determine a valley point of the output voltage is shifted as a reference to determine a peak point of the output voltage. Preferably, after the power converter is switched to the quasi-constant off-time mode, the on-time of the high-side switch is maintained above a preset minimum. Preferably, when the on-time of the high-side switch decreases to the minimum, the turn-off of the low-side switch is delayed.

According to the present invention, a control circuit for audio-skipping of a constant on-time power converter having a pair of high-side switch and low-side switch uses a timer to count an off-time of the high-side switch, and when the off-tome reaches a threshold, triggers a signal to forcibly turn on the high-side switch, activates a voltage-controlled voltage source to provide a bias voltage to shift a reference voltage or a feedback signal for determining a peak point of an output voltage, and switches the power converter to a quasi-constant off-time mode where a constant off-time of the high-side switch is triggered responsive to an output voltage reaching a peak point.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
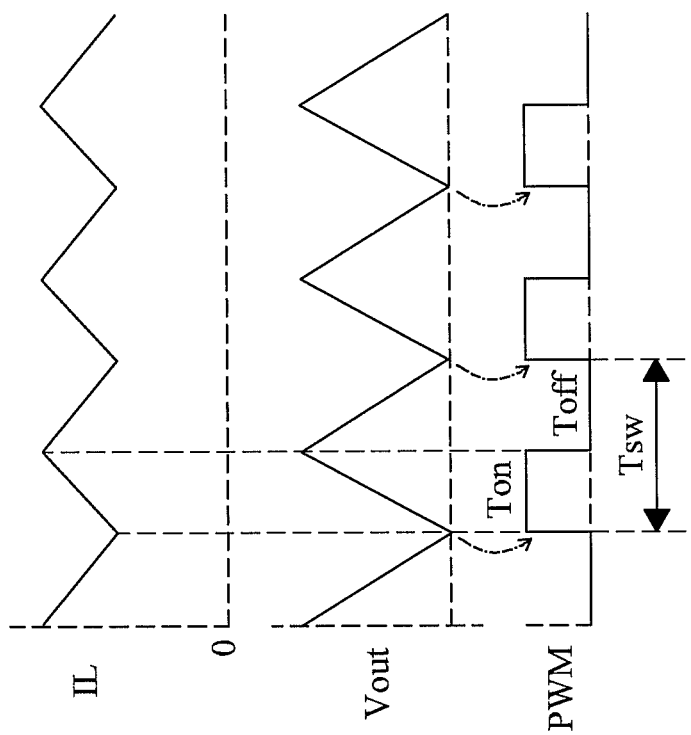
FIG. 1 is a waveform diagram of a constant on-time buck converter.
Figure 4:
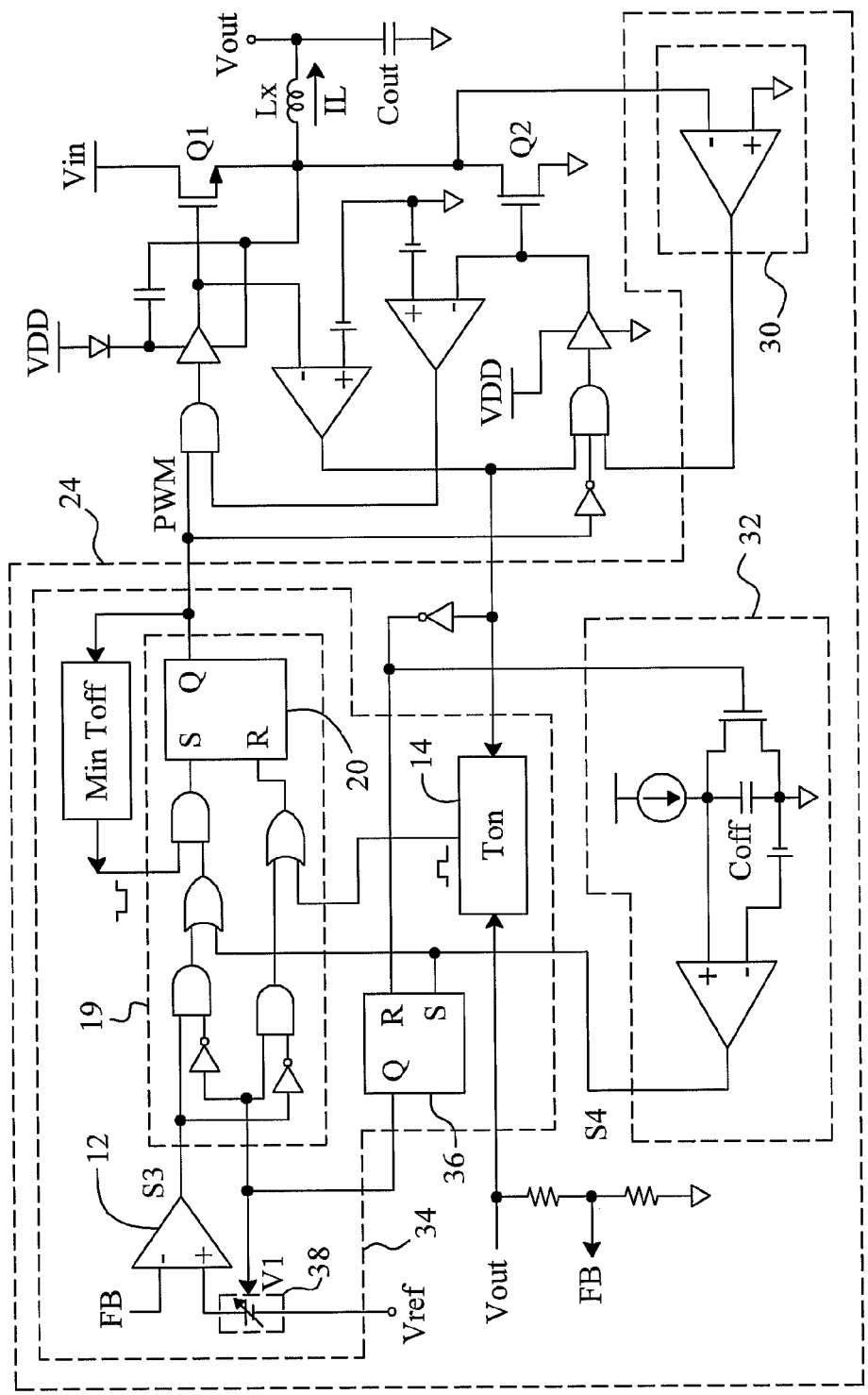
FIG. 4 is a circuit diagram of a constant on-time buck converter using a control circuit of a first embodiment according to the present invention.

FIG. 4 is a circuit diagram of a constant on-time buck converter using a control circuit of a first embodiment according to the present invention, which includes a pair of high-side switch Q1 and low-side switch Q2, and a control circuit 24 to provide a modulation signal PWM to switch the switches Q1 and Q2. The control circuit 24 includes a zero current detector 30, a timer 32 and a modulation circuit 34. At middle loading and heavy loading, the inductor current IL of the converter is operated in a continuous conduction mode (CCM) as shown in FIG. 1, during which the modulation circuit 34 uses a comparator 12 to compare a feedback voltage FB related to the output voltage Vout with a reference voltage Vref with to generate a signal S3 for triggering an SR flip-flop 20 in a logic circuit 19, thereby generating the modulation signal PWM of high state to turn on the high-side switch Q1, and after a constant time period Ton, the on-time circuit 14 will reset the SR flip-flop 20, turning the modulation signal PWM to low state, to thereby end the on-time of the high-side switch Q1. When the converter comes into light loading, the zero current detector 30 acts to maintain the inductor current IL positive and thus make the power converter enter its PSM naturally to improve efficiency. During this time, the timer 32 counts the off-time of the high-side switch Q1, namely the sum of the time when the low-side switch Q2 is on and the time when both the switches Q1 and Q2 are off, and once the off-time is detected to reach a threshold, for example 30-40 μs, the output signal S4 of the timer 32 is pulled high and thus, sets the SR flip-flop 20 to forcibly turn on the high-side switch Q1, thereby preventing the switching frequency from decreasing to the audible range, and sets an SR flip-flop 36 to activate a voltage-controlled voltage source 38 to provide a bias voltage V1 to shift the reference voltage Vref, and switch the system to detect the peak point of the output voltage Vout by switching the transmission path of the signal S3 to the reset input of the SR flip-flop 20, so that when the feedback voltage FB increases to cross over the new reference Vref+V1, the signal S3 will transit to low to reset the SR flip-flop 20, thereby turning off the high-side switch Q1 and turning on the low-side switch Q2, while the timer 32 starts to count the off-time of the high-side switch Q1, and once the off-time reaches the threshold again, the high-side switch Q1 will be turned on again. In some other embodiments, the voltage-controlled voltage source 38 may be configured at the inverting input of the comparator 12, to have the bias voltage V1 to subtract the feedback voltage FB, namely shift the feedback voltage FB by the bias voltage V1.

Figure 2:
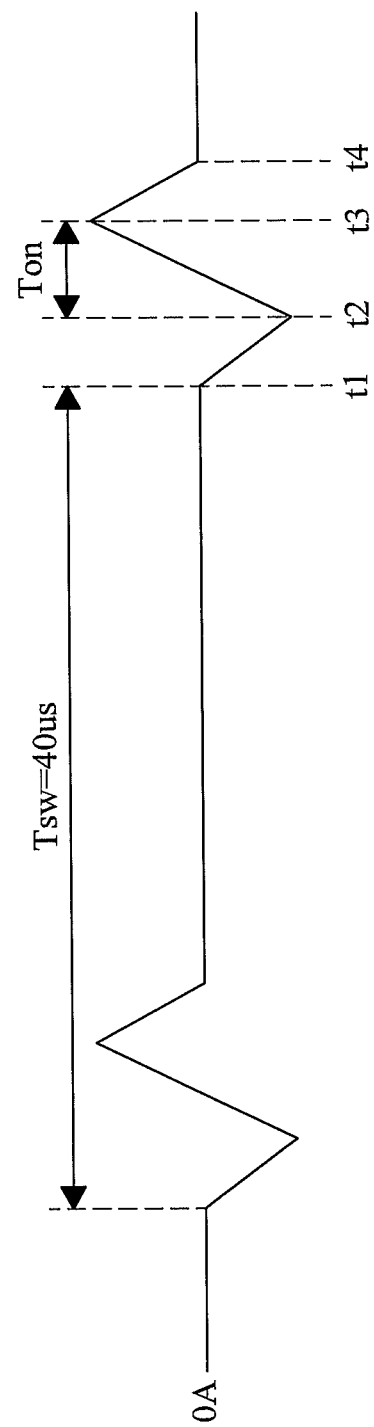
FIG. 2 is a waveform diagram of an inductor current of a conventional constant on-time buck converter.
Figure 3:
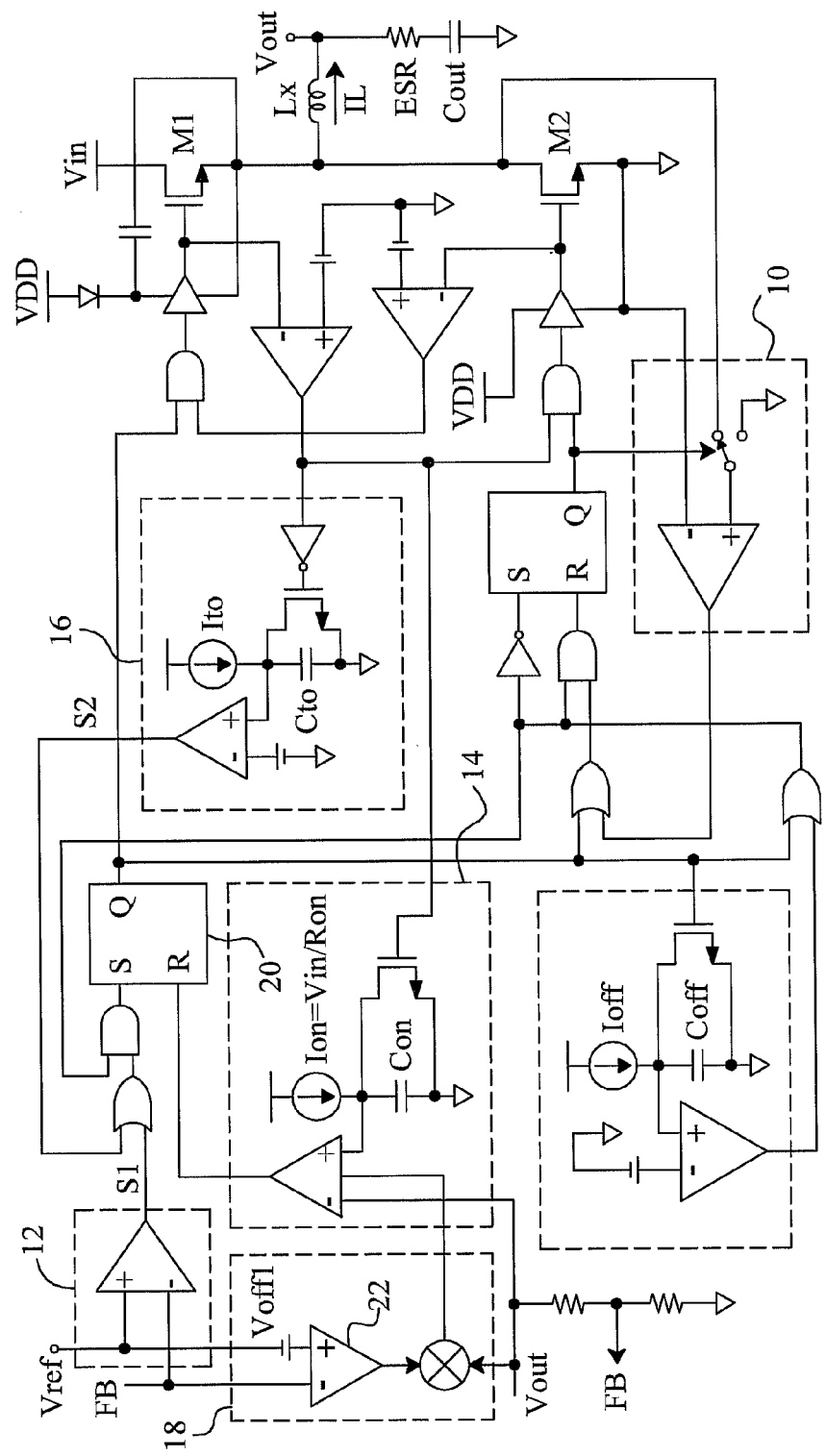
FIG. 3 is a circuit diagram of a conventional constant on-time buck converter operating free of an audible frequency range.
Figure 5:
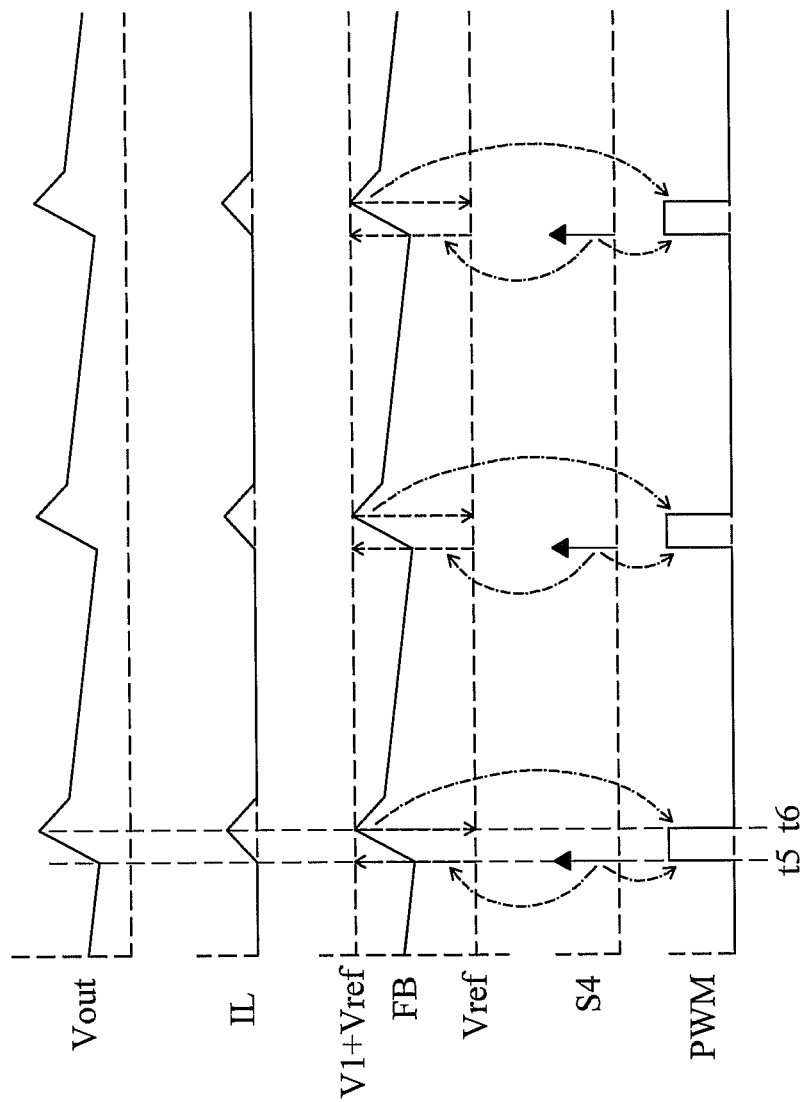
FIG. 5 is a waveform diagram of the circuit shown in FIG. 4.

FIG. 5 is a waveform diagram of the circuit shown in FIG. 4. At time t5, the off-time of the high-side switch Q1 reaches the threshold, so the timer 32 pulls high the signal S4 to set the SR flip-flops 20 and 36, thereby pulling high the modulation signal PWM and activating the voltage-controlled voltage source 38. As a result, the high-side switch Q1 is turned on, and the non-inverting input of the comparator 12 changes from Vref to V1+Vref which determines the peak point of the output voltage Vout. After the high-side switch Q1 is turned on, the output voltage Vout and thereby the feedback voltage FB increase, and until time t6, the feedback voltage FB becomes greater than Vref+V1, so the comparator 12 pulls high the signal S3 to reset the SR flip-flop 20, and thus the modulation signal PWM transits to low to turn off the high-side switch Q1. The on-time of the high-side switch Q1 starts at the time the signal S4 is triggered and ends at the time the feedback voltage FB reaches Vref+V1, which becomes variable and shortens with the decrease of the loading current. Compared with that depicted in FIG. 2, the control method according to the present invention will not generate negative inductor current and thus provides better efficiency. Compared with the circuit of FIG. 3, the control circuit according to the present invention can easily achieve audio-skipping of a COT power converter only by adding a digital circuit, such as logic gates in the logic circuit 19, to an existing converter, without using any analog circuit like the transconductance amplifier 22 in the on-time shaver 18, and hence is simpler to reduce its area penalty.

Figure 6:
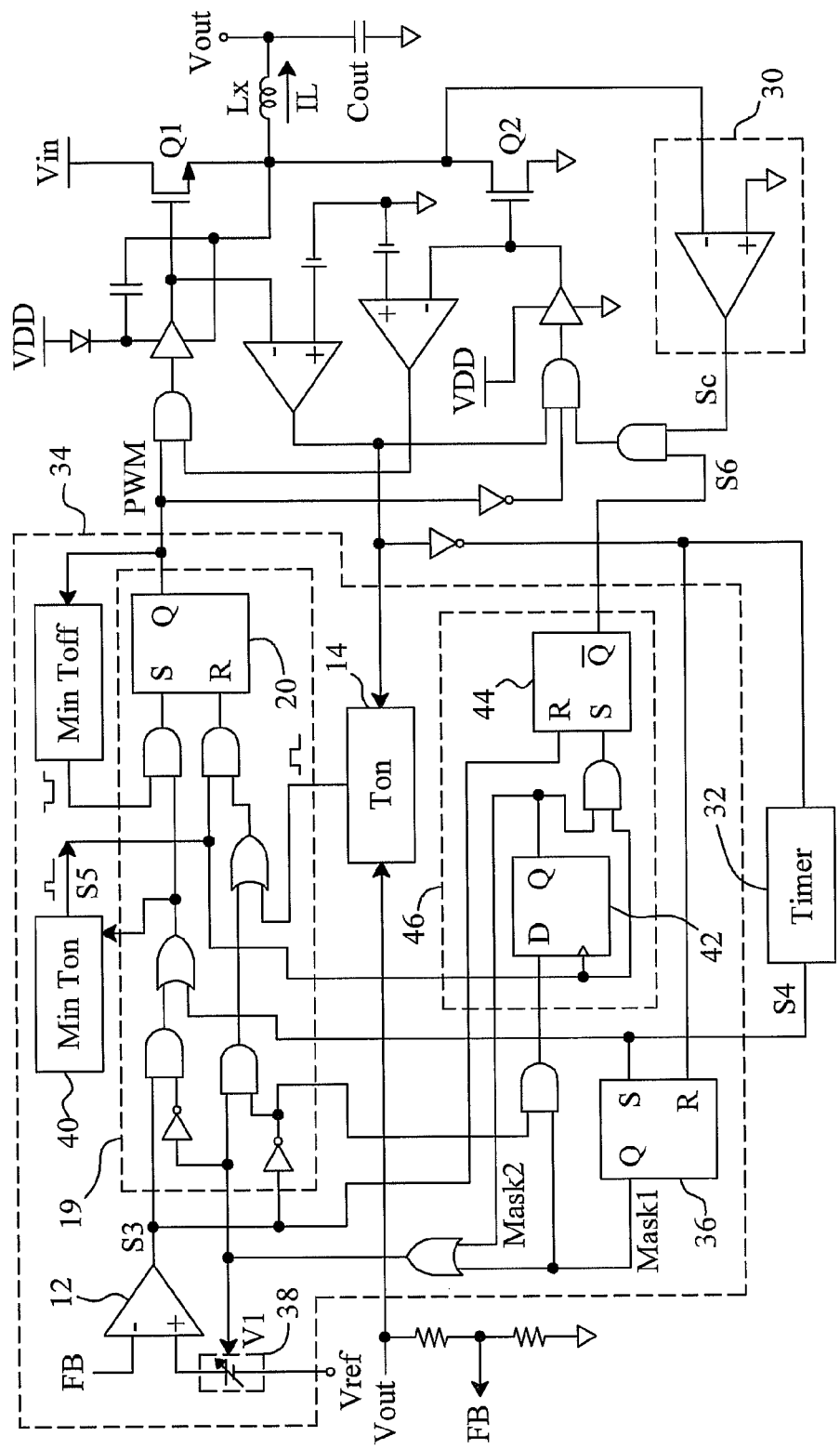
FIG. 6 is a circuit diagram of a constant on-time buck converter using a control circuit of a second embodiment according to the present invention.

As loading further decreases from light to zero, the on-time of the high-side switch Q1 will shorten more and more until the preset minimum is met in which state the switching frequency has decreased to the threshold, and the inductor current IL and loading current will lose their balance again. Since it has been the minimum on-time, the inductor current IL can not further decrease with the loading current, and the output voltage Vout will gradually increase. To solve this problem, as shown in FIG. 6, the modulation circuit 34 may be added with a minimum on-time circuit 40 and a logic circuit 46 including a D-type flip-flop 42 and an SR flip-flop 44. At light loading, the minimum on-time circuit 40 is triggered by the signal S4 provided by the timer 32 to count the on-time of the high-side switch Q1, and once the on-time of the high-side switch Q1 reaches the preset minimum, the minimum on-time circuit 40 will pull high a signal S5. The D-type flip-flop 42 acts as a minimum on-time detector, having its clock input CLK to receive the signal S5 generated by the minimum on-time circuit 40. When the signal S5 transits to high, if the D-type flip-flop 42 has identified from its D input that the feedback voltage FB becomes greater than Vref+V1, the power converter is regarded as reaching its minimum on-time state, so that the D-type flip-flop 42 will trigger the SR flip-flop 44, thereby pulling high a signal S6 to delay the signal Sc that is generated by the zero current detector 30 to turn off the low-side switch Q2, thereby allowing generation of negative inductor current until the comparator 12 detects that the feedback voltage FB has decreased beyond Vref+V1, the output signal S3 of the comparator 12 will reset the SR flip-flop 44, thereby allowing the off signal Sc to turn off the low-side switch Q2, resulting in the switches Q1 and Q2 both off until again the timer 32 triggers the SR flip-flop 20 to turn on the high-side switch Q1.

Figure 7:
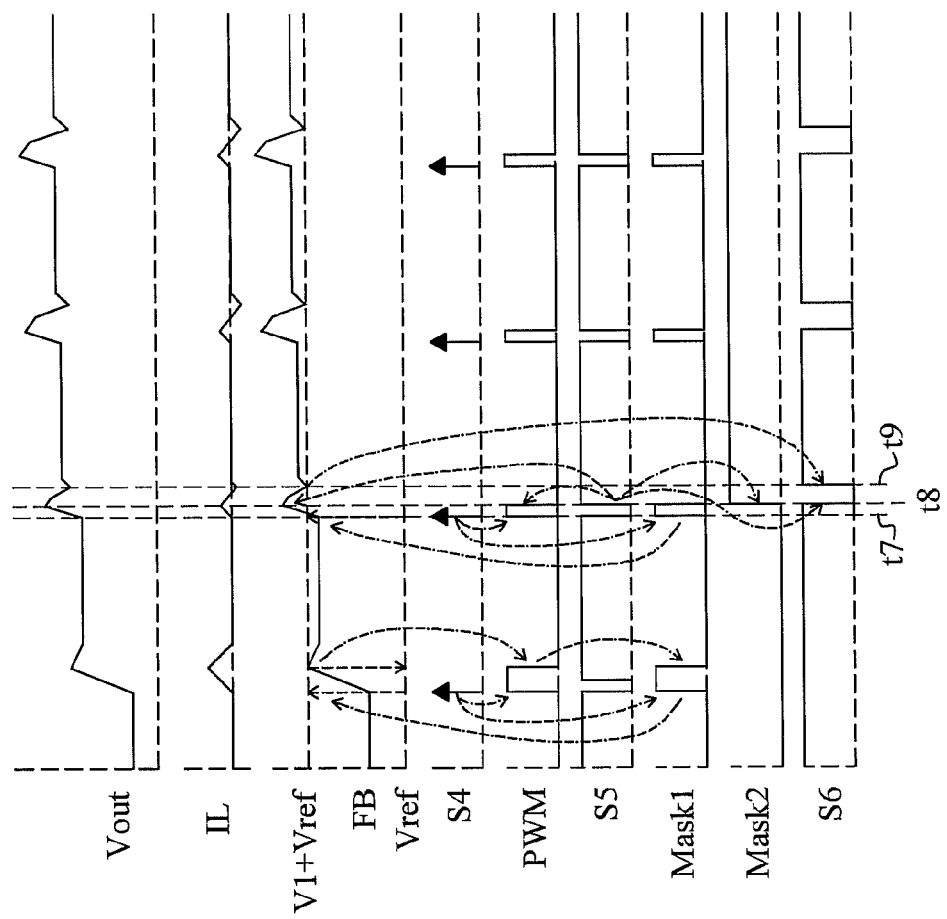
FIG. 7 is a waveform diagram of the circuit shown in FIG. 6.

FIG. 7 is a waveform diagram of the circuit shown in FIG. 6. Referring to FIG. 6 and FIG. 7, at time t7, the off-time of the high-side switch Q1 reaches the threshold, so the timer 32 triggers the signal S4 to turn on the high-side switch Q1, and also triggers a signal Mask1 to activate the voltage-controlled voltage source 38. Since lighter loading will result in higher output voltage Vout, the feedback voltage FB can soon become greater than Vref+V1. However, at this time, the on-time of the high-side switch Q1 has not reached the minimum on-time yet, so the SR flip-flop 20 will not be reset to turn off the high-side switch Q1 until the minimum on-time is reached, as shown at time t8, the minimum on-time circuit 40 pulls high the signal S5 to reset the SR flip-flop 20 and triggers the D-type flip-flop 42 to pull high a signal Mask2, thereby turning off the high-side switches Q1 and the signal Mask1. At this time, since the signals S5 and Mask2 are both high, the output signal S6 of the SR flip-flop 44 will be low and thus delays the off signal Sc generated by the zero current detector 30, thereby generating negative inductor current IL until the comparator 12 detects that the feedback voltage FB becomes lower than Vref+V1, as shown at time t9, by which the SR flip-flop 44 will be reset to turn off the low-side switch Q2. In this embodiment, the negative inductor current IL helps to balance excessive inductor current IL and maintain the output voltage Vout in a certain range.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for audio-skipping of a constant on-time power converter which determines a valley point of an output voltage with reference to a reference voltage, triggers a constant on-time of a high-side switch whenever a feedback signal related to the output voltage decreases to the reference voltage, and turns off a low-side switch whenever an inductor current decreases to zero, the control method comprising the steps of: detecting a switching frequency of the power converter; responsive to the switching frequency decreasing to a threshold, counting an off-time of the high-side switch, and triggering a first signal to forcibly turn on the high-side switch responsive to the off-time reaching a threshold; providing a bias voltage to shift the reference voltage or the feedback signal for determining a peak point; and switching the power converter to a mode in which a constant off-time of the high-side switch is triggered whenever the output voltage reaches the peak point.

2. The control method of claim 1, further comprising the step of maintaining an on-time of the high-side switch above a minimum in the mode.

3. The control method of claim 2, further comprising the steps of:
counting the on-time of the high-side switch after the high-side switch is turned on; and
delaying to turn off the low-side switch responsive to the on-time of the high-side switch decreasing to the minimum.

4. A control circuit for audio-skipping of a constant on-time power converter which includes a modulation circuit to determine a valley point of an output voltage with reference to a reference voltage, and to trigger a constant on-time of a high-side switch whenever a feedback signal related to the output voltage decreases to the reference voltage, and a zero current detector to trigger an off signal to turn off a low-side switch whenever an inductor current decreases to zero, the control circuit comprising:
a timer connected to the modulation circuit, counting an off-time of the high-side switch, and triggering a first signal to forcibly turn on the high-side switch responsive to the off-time reaching a threshold;
a voltage-controlled voltage source, activated by the first signal to provide a bias voltage to shift the reference voltage or the feedback signal to determine a peak point of the output voltage; and
a logic circuit connected to the timer, responsive to the first signal to switch the power converter to a mode in which a constant off-time of the high-side switch is triggered whenever the output voltage reaches the peak point.

5. The control circuit of claim 4, further comprising a minimum on-time circuit connected to logic circuit, counting an on-time of the high-side switch after the high-side switch is turned on, and triggering a second signal applied to the logic circuit responsive to the on-time of the high-side switch reaching a preset value so that the logic circuit maintains the on-time of the high-side switch above a minimum.

6. The control circuit of claim 5, further comprising a second logic circuit connected to the minimum on-time circuit, delaying the off signal when the on-time of the high-side switch decreases to the minimum.

* * * * *